United States Patent
Fang et al.

(10) Patent No.: US 7,004,434 B2
(45) Date of Patent: Feb. 28, 2006

(54) LEVEL ADJUSTING DEVICE FOR ADJUSTING THE LEVEL OF AN OBJECT MOUNTED THEREON

(75) Inventors: Zhi-Hong Fang, Hang-zhou (CN); Yue-Ye Chen, Hang-zhou (CN)

(73) Assignee: Asia Optical Co., Inc., Taichung (TW)

(*) Notice: Subject to any disclaimer, the term of this patent is extended or adjusted under 35 U.S.C. 154(b) by 96 days.

(21) Appl. No.: 10/861,547

(22) Filed: Jun. 4, 2004

(65) Prior Publication Data
US 2005/0184205 A1   Aug. 25, 2005

(30) Foreign Application Priority Data
Feb. 20, 2004   (TW) ............................. 93104257 A (51) Int. Cl.
*F16M 11/24*   (2006.01)
(52) U.S. Cl. ................................. 248/188.2; 248/188.4
(58) Field of Classification Search ........... 248/346.05, 248/188.2, 188.4, 178.1, 176.1, 346.01, 638; 182/141
See application file for complete search history.

(56) References Cited

U.S. PATENT DOCUMENTS

| | | | | |
|---|---|---|---|---|
| 3,880,096 A | * | 4/1975 | Kaplan | 108/141 |
| 4,919,382 A | * | 4/1990 | Forman | 248/178.1 |
| 6,729,590 B1 | * | 5/2004 | Gabriel | 248/188.2 |
| 6,796,538 B1 | * | 9/2004 | Hsu et al. | 248/188.2 |

* cited by examiner

*Primary Examiner*—Robert P. Olszewski
*Assistant Examiner*—Timothy S. Smith
(74) *Attorney, Agent, or Firm*—Townsend and Townsend and Crew LLP (57) ABSTRACT

A level adjusting device includes a base, first and second posts standing upright from the base, a first push lever movable in a vertical direction, a second push lever movable in the vertical direction, a pivot post standing upright from the base and spaced apart from the first and second posts, first and second pivot pins extending in a transverse direction relative to the vertical direction, a pivot block pivoted to the pivot post through the first pivot pin, a carrier plate connected to the first and second push levers and pivoted to the pivot block through the second pivot pin, and a biasing unit disposed between and connected to the carrier plate and the base.

5 Claims, 8 Drawing Sheets

LEVEL ADJUSTING DEVICE FOR ADJUSTING THE LEVEL OF AN OBJECT MOUNTED THEREON

CROSS-REFERENCE TO RELATED APPLICATION

This application claims priority of Taiwanese application No. 093104257, filed on Feb. 20, 2004.

BACKGROUND OF THE INVENTION

1. Field of the Invention

This invention relates to a level adjusting device, more particularly to a level adjusting device with a pivot block pivoted to a pivot post and a carrier plate pivoted to the pivot block.

2. Description of the Related Art

Figure 1:
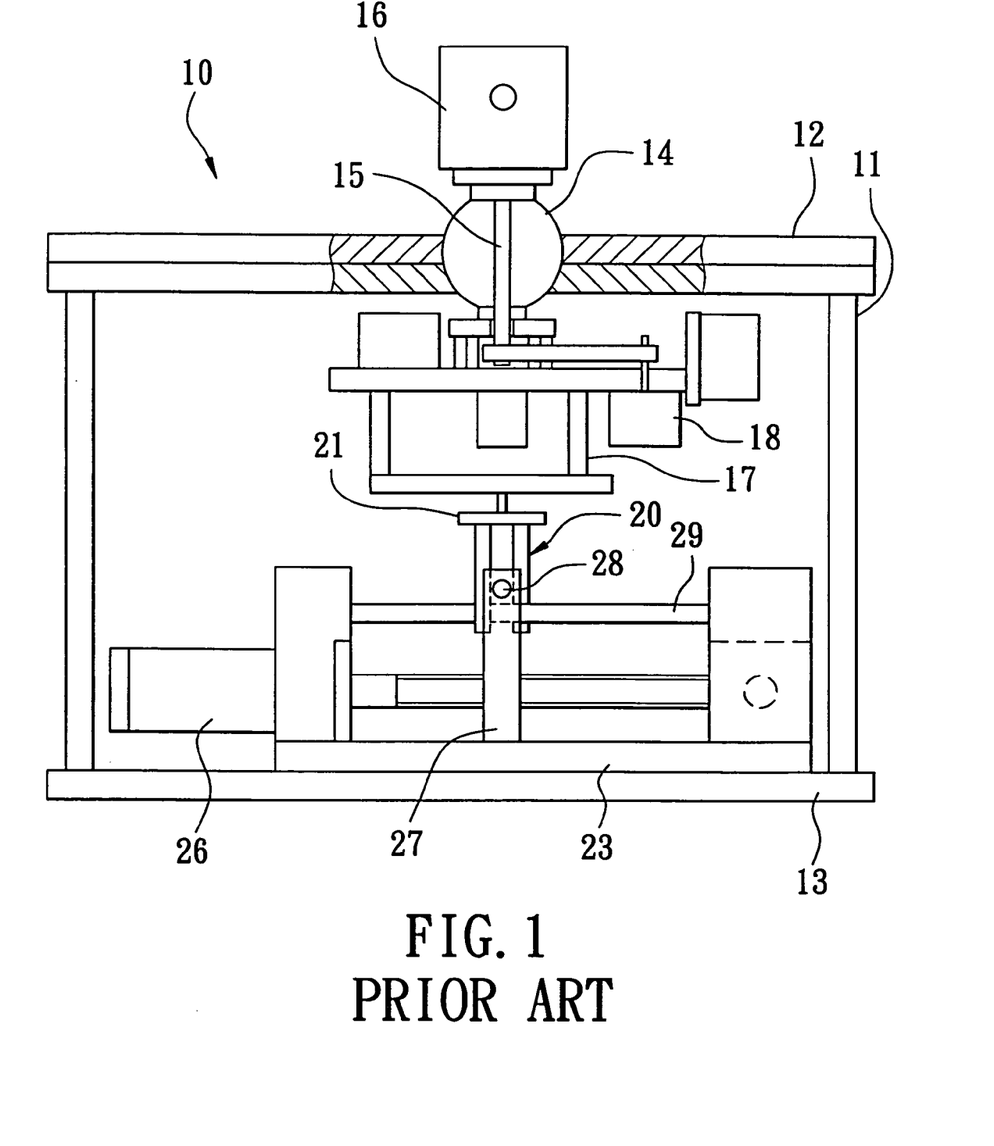
FIG. 1 is a cutaway view of a conventional level adjusting device with an object mounted thereon.
Figure 2:
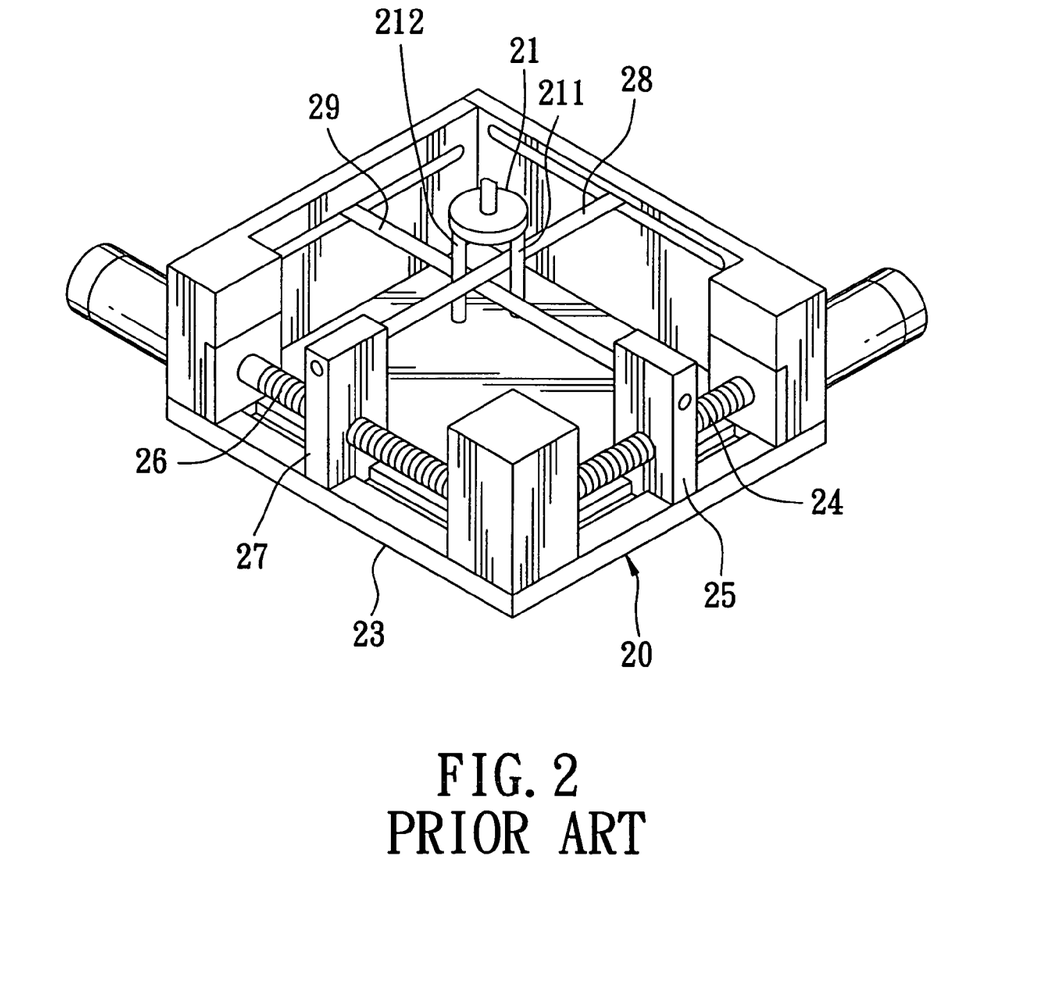
FIG. 2 is a fragmentary perspective view of a transmission unit of the level adjusting device of FIG. 1.
Figure 3:
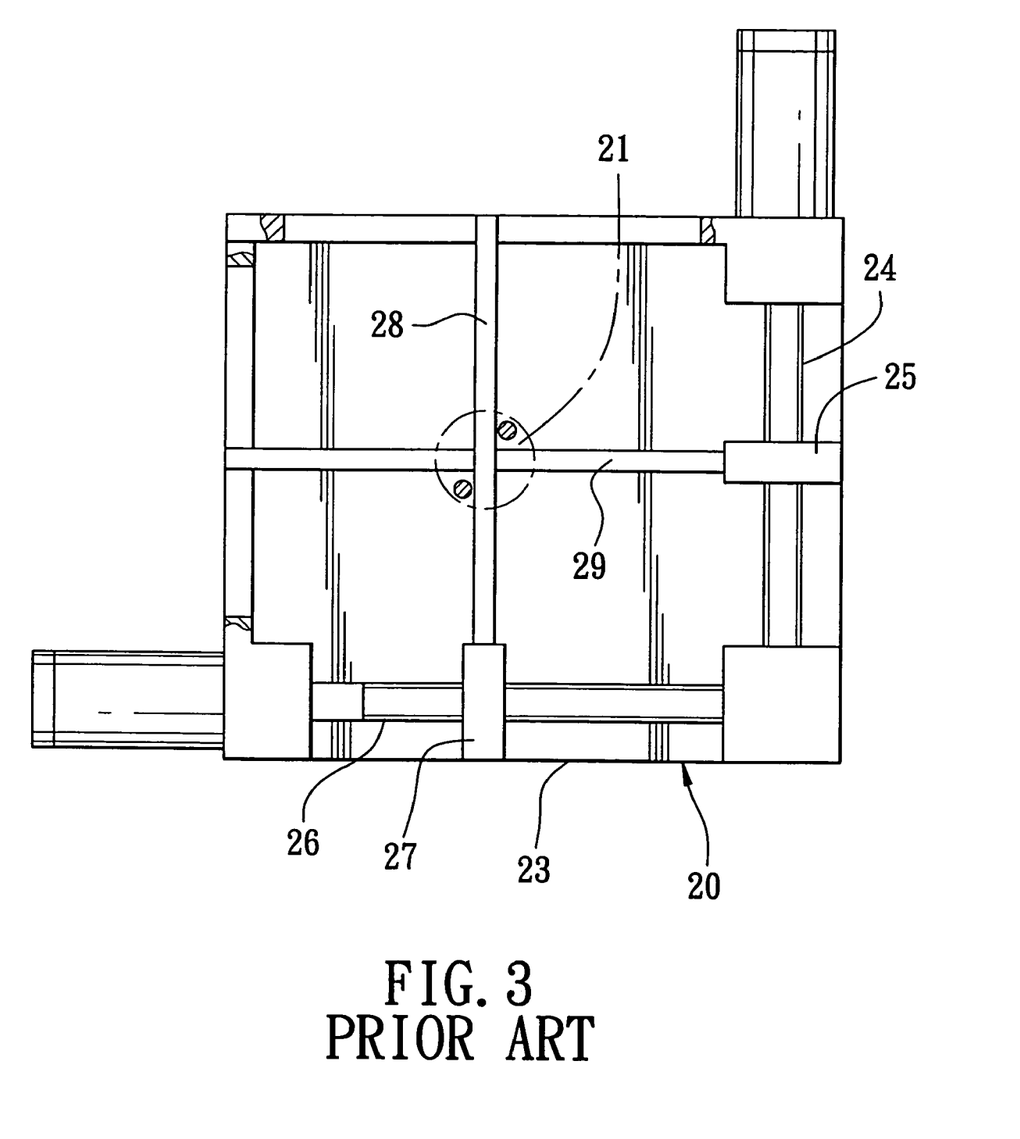
FIG. 3 is a cutaway top view of the transmission unit of the level adjusting device of FIG. 1.

FIGS. 1 to 3 illustrate a conventional level adjusting device 10 for adjusting the level of an object 16, such as a laser emitting head, mounted thereon. The level adjusting device 10 includes a base 13, a plurality of posts 11 standing upright from the base 13, a mounting plate 12 supported by the posts 11, a rotatable spherical body 14 mounted in an opening in the mounting plate 12, and a shaft 15 connected to the object 16, extending through the spherical body 14 and driven by a rotor 18 so as to permit rotation of the object 16 upon actuation of the rotor 18. The shaft 15 together with the object 16 is slightly moved relative to a horizontal plane, i.e., the sea level, upon rotation of the spherical body 14 during level adjustment of the object 16. The spherical body 14 is moved to rotate by a transmission unit 20 that includes a mounting seat 17 connected to the spherical body 14, a connecting member 21 connected to the mounting seat 17 and having two opposite legs 211, a first operating rod 28 engageable with one of the legs 211 for driving the connecting member 21 to move in a first horizontal direction and engageable with the other of the legs 211 for driving the connecting member 21 to move in a first opposite direction opposite to the first horizontal direction, and a second operating rod 29 engageable with one of the legs 211 for driving the connecting member 21 to move in a second horizontal direction and engageable with the other of the legs 211 for driving the connecting member 21 to move in a second opposite direction opposite to the second horizontal direction. The first and second operating rods 28, 29 are mounted slidably on a support 23 through first and second threaded blocks 27, 25 and first and second screw rods 26, 24 which engage threadedly and respectively the first and second threaded blocks 27, 25. In operation, movement of the first or second operating rod 28, 29 or both the first and second operating rods 28, 29 results in rotation of the spherical body 14, which, in turn, results in co-movement of the object 16 and the shaft 15 to the sea level.

The aforesaid conventional level adjusting device 10 is disadvantageous in that the level adjustment of the object 16 is time-consuming. For instance, since the spherical body 14 can only rotate about its center, movement of the first operating rod 28 not only results in movement of the connecting member 21 in the first horizontal direction, but also results in undesired movement of the transmission member 21 in the second horizontal direction due to rotation of the spherical body 14, which requires further operation of the second operating rod 29 to adjust the level of the object 16, which, in turn, requires further operation of the first operating rod 28, and so on, thereby results in time-consuming.

SUMMARY OF THE INVENTION

Therefore, the object of the present invention is to provide a level adjustment device that is capable of overcoming the aforesaid drawback associated with the prior art.

According to the present invention, there is provided a level adjustment device for adjusting the level of an object mounted thereon. The level adjusting device includes: a base; spaced apart first and second posts mounted on and standing upright from the base; a first push lever mounted movably on the first post, extending in a first horizontal direction, and movable in a vertical direction that is perpendicular to the first horizontal direction; a second push lever mounted movably on the second post, extending in a second horizontal direction that is transverse to the first horizontal direction and that is perpendicular to the vertical direction, and movable in the vertical direction; a pivot post mounted on and standing upright from the base at a position that is vertically aligned with an intersection of the first and second horizontal directions; a first pivot pin extending in the first horizontal direction; a second pivot pin extending in the second horizontal direction; a pivot block pivoted to the pivot post through the first pivot pin so as to be pivotable about the first pivot pin; a carrier plate connected to the first and second push levers so as to be moved upon movement of the first and second push levers, adapted to hold the object thereon, and pivoted to the pivot block through the second pivot pin so as to be pivotable about the second pivot pin upon movement of the first push lever in the vertical direction and so as to be pivotable together with the pivot block about the first pivot pin upon movement of the second push lever in the vertical direction, thereby permitting level adjustment of the object on the carrier plate; and a biasing unit disposed between and connected to the carrier plate and the base for urging the carrier plate against pushing action of the first push lever when the first push lever is moved in the vertical direction and pushing action of the second push lever when the second push lever is moved in the vertical direction.

BRIEF DESCRIPTION OF THE DRAWINGS

In drawings which illustrate an embodiment of the invention.

DETAILED DESCRIPTION OF THE PREFERRED EMBODIMENT

FIGS. 4 to 8 illustrate the preferred embodiment of a level adjusting device according to the present invention for adjusting an object 100, such as a horizontal laser head 101 or a vertical laser head 102 (see FIG. 8), or both, mounted thereon. The level adjusting device includes: a base 30; spaced apart first and second posts 41, 51 mounted on and standing upright from the base 30; a first push lever 43 mounted movably on the first post 41, extending in a first horizontal direction (X), and movable in a vertical direction (Z) that is perpendicular to the first horizontal direction (X); a second push lever 53 mounted movably on the second post 51, extending in a second horizontal direction (Y) that is transverse to the first horizontal direction (X) and that is perpendicular to the vertical direction (Z), and movable in the vertical direction (Z); a pivot post 71 mounted on and standing upright from the base 30 at a position that is vertically aligned with an intersection of the first and second horizontal directions (X,Y); a first pivot pin 73 extending in the first horizontal direction (X); a second pivot pin 74 extending in the second horizontal direction (Y); a pivot block 72 pivoted to the pivot post 71 through the first pivot pin 73 so as to be pivotable about the first pivot pin 73; a carrier plate 6 connected to the first and second push levers 43, 53 so as to be moved upon movement of the first and second push levers 43, 53, adapted to hold the object 100 thereon, and pivoted to the pivot block 72 through the second pivot pin 74 so as to be pivotable about the second pivot pin 74 upon movement of the first push lever 43 in the vertical direction (Z) and so as to be pivotable together with the pivot block 72 about the first pivot pin 73 upon movement of the second push lever 53 in the vertical direction (Z), thereby permitting level adjustment of the object 100 on the carrier plate 6; and a biasing unit 80 disposed between and connected to the carrier plate 6 and the base 30 for urging the carrier plate 6 against the pushing action of the first push lever 43 when the first push lever 43 is moved in the vertical direction (Z) and the pushing action of the second push lever 53 when the second push lever 53 is moved in the vertical direction (Z).

Figure 4:
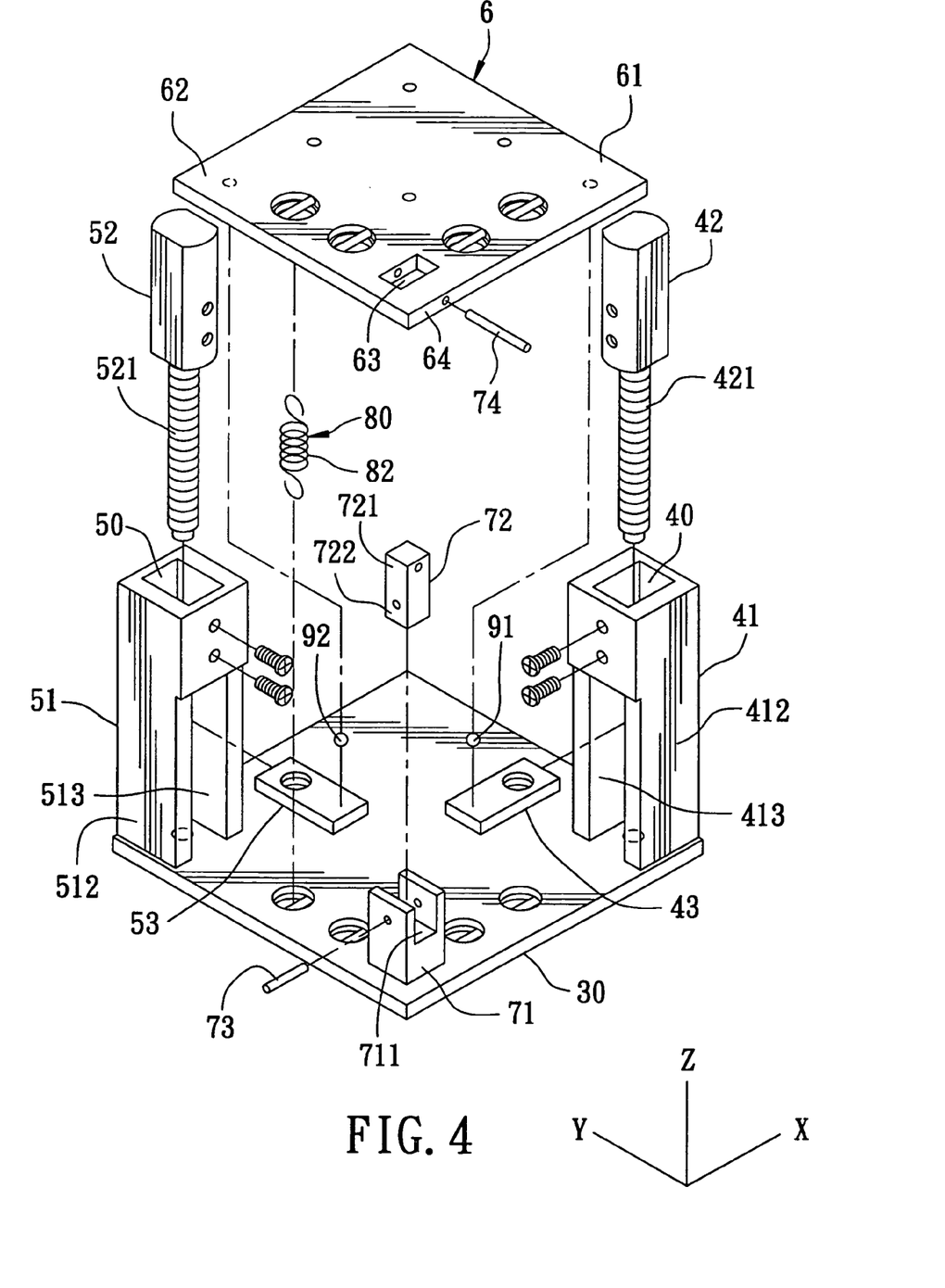
FIG. 4 is an exploded perspective view of the preferred embodiment of a level adjusting device according to this invention.
Figure 5:
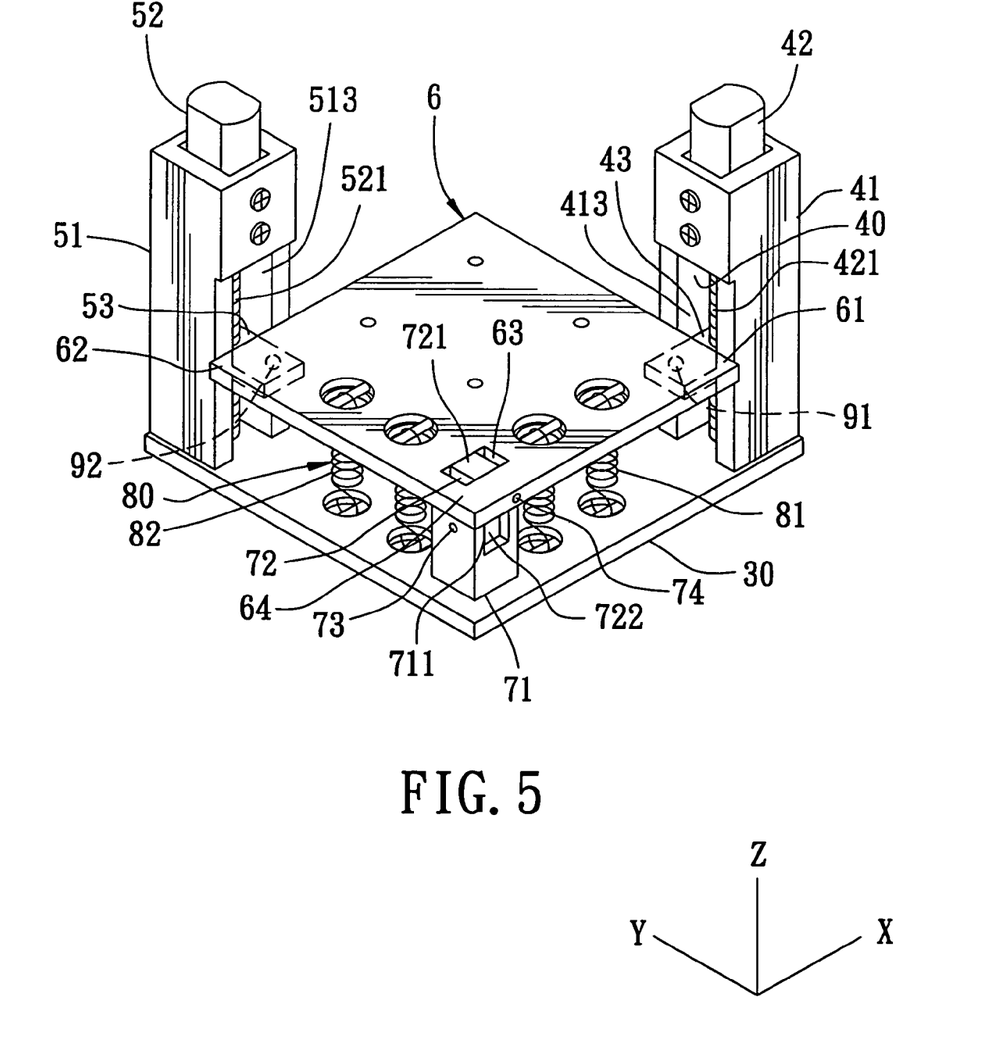
FIG. 5 is a perspective view of the preferred embodiment of this invention.

In this embodiment, the carrier plate 6 has diagonally disposed first and second corners 61, 62 and a middle corner 64 spaced apart from the first and second corners 61, 62. The first and second corners 61, 62 are seated respectively on the first and second push levers 43, 53. The middle corner 64 is pivoted to the pivot block 72. The biasing unit 80 includes at least a first spring 81 disposed between the first and middle corners 61, 64, and at least a second spring 82 disposed between the second and middle corners 62, 64. Alternatively, the first and second corners 61, 62 of the carrier plate 6 can be disposed respectively underneath the first and second push levers 43, 53. As such, the first and second springs 81, 82 of the biasing unit 80 will be in the form of compression springs.

The level adjusting device further includes a rigid first ball 91 disposed between and in rolling contact with the first corner 61 and the first push lever 43, and a rigid second ball 92 disposed between and in rolling contact with the second corner 62 and the second push lever 53.

Each of the first and second posts 41, 51 is hollow, defines an inner space 40 (50) therein, and is formed with an elongated opening 413 (513) that extends in the vertical direction (Z), that opens toward the pivot post 71, and that is in spatial communication with the inner space 40 (50). Each of the first and second posts 41, 51 has two opposite side walls 412 (512) that confine two opposite sides of the inner space 40 (50). The level adjusting device further includes first and second driving members 42, 52 that are mounted respectively on the first and second posts 41, 51, and first and second screw rods 421, 521 that are disposed respectively in the inner spaces 40, 50 in the first and second posts 41, 51, that extend in the vertical direction (Z), and that are driven by the first and second driving members 42, 52. Each of the first and second push levers 43, 53 engages threadedly a respective one of the first and second screw rods 421, 521, and is limited by the side walls 412 (512) of a respective one of the first and second posts 41, 51 so as to be limited from co-rotating with the respective one of the first and second screw rods 421, 521 upon actuation of the respective one of the first and second driving members 42, 52 and so as to move in the vertical direction (Z) upon rotation of the respective one of the first and second screw rods 421, 521. The first and second push levers 43, 53 extend respectively from the first and second screw rods 421, 521 through the elongated openings 413, 513 in the first and second posts 41, 51.

The carrier plate 6 is formed with a through-hole 63 that is vertically aligned with the intersection of the first and second horizontal directions (X, Y). The pivot post 71 is formed with a recess 711 that is vertically aligned with and that opens toward the through-hole 63 in the carrier plate 6. The pivot block 72 has a lower portion 722 that is received in the recess 711 in the pivot post 71, and an upper portion 721 that extends into the through-hole 63 in the carrier plate 6. The first pivot pin 73 extends through the pivot post 71 and the lower portion 722 of the pivot block 72. The second pivot pin 74 extends through the upper portion 721 of the pivot block 72 and into the carrier plate 6.

Figure 6:
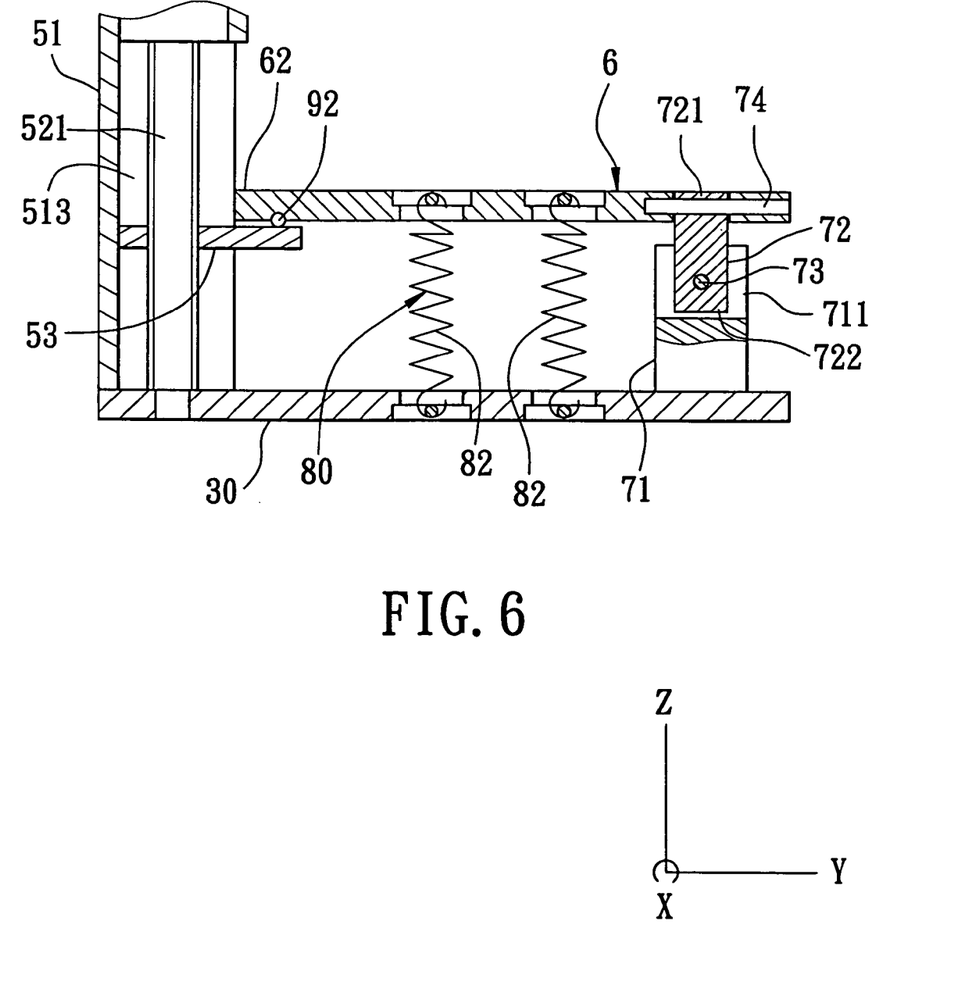
FIG. 6 is a fragmentary sectional view to illustrate how a carrier plate is moved by moving a first push lever of the preferred embodiment of this invention in a first horizontal direction.
Figure 7:
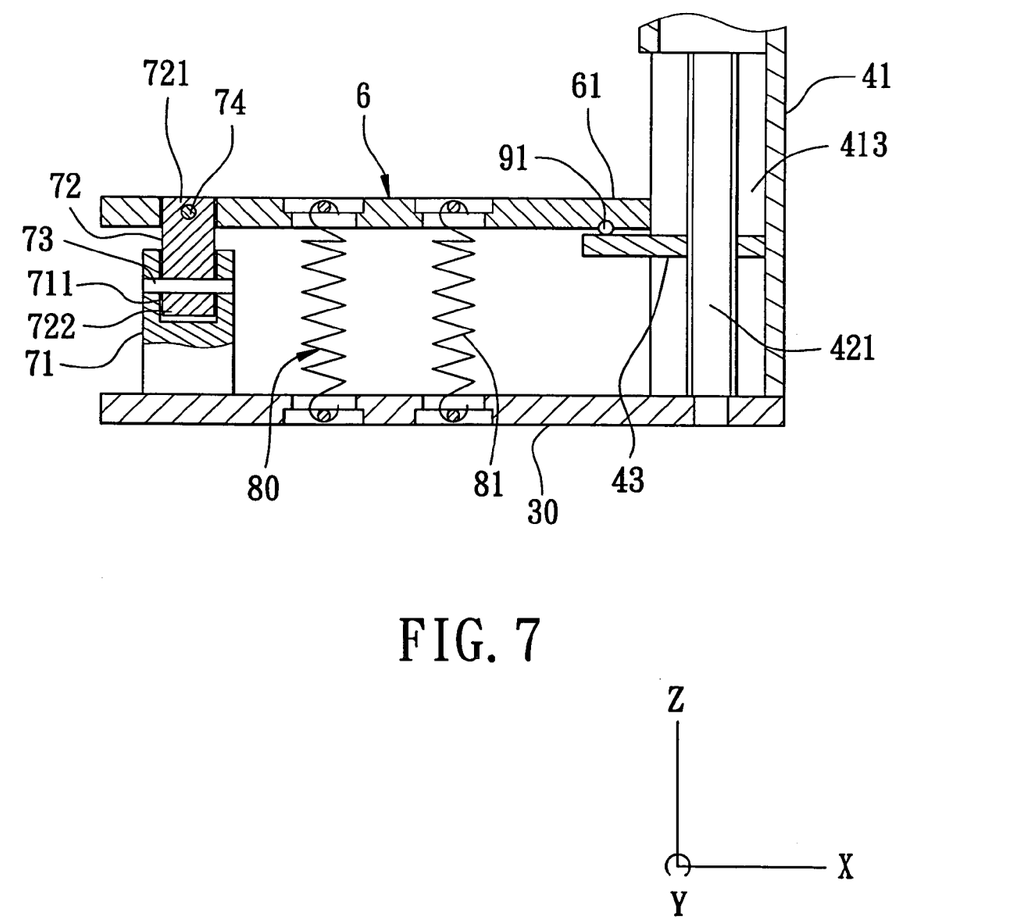
FIG. 7 is a fragmentary sectional view to illustrate how the carrier plate is moved by moving a second push lever of the preferred embodiment of this invention in a second horizontal direction.
Figure 8:
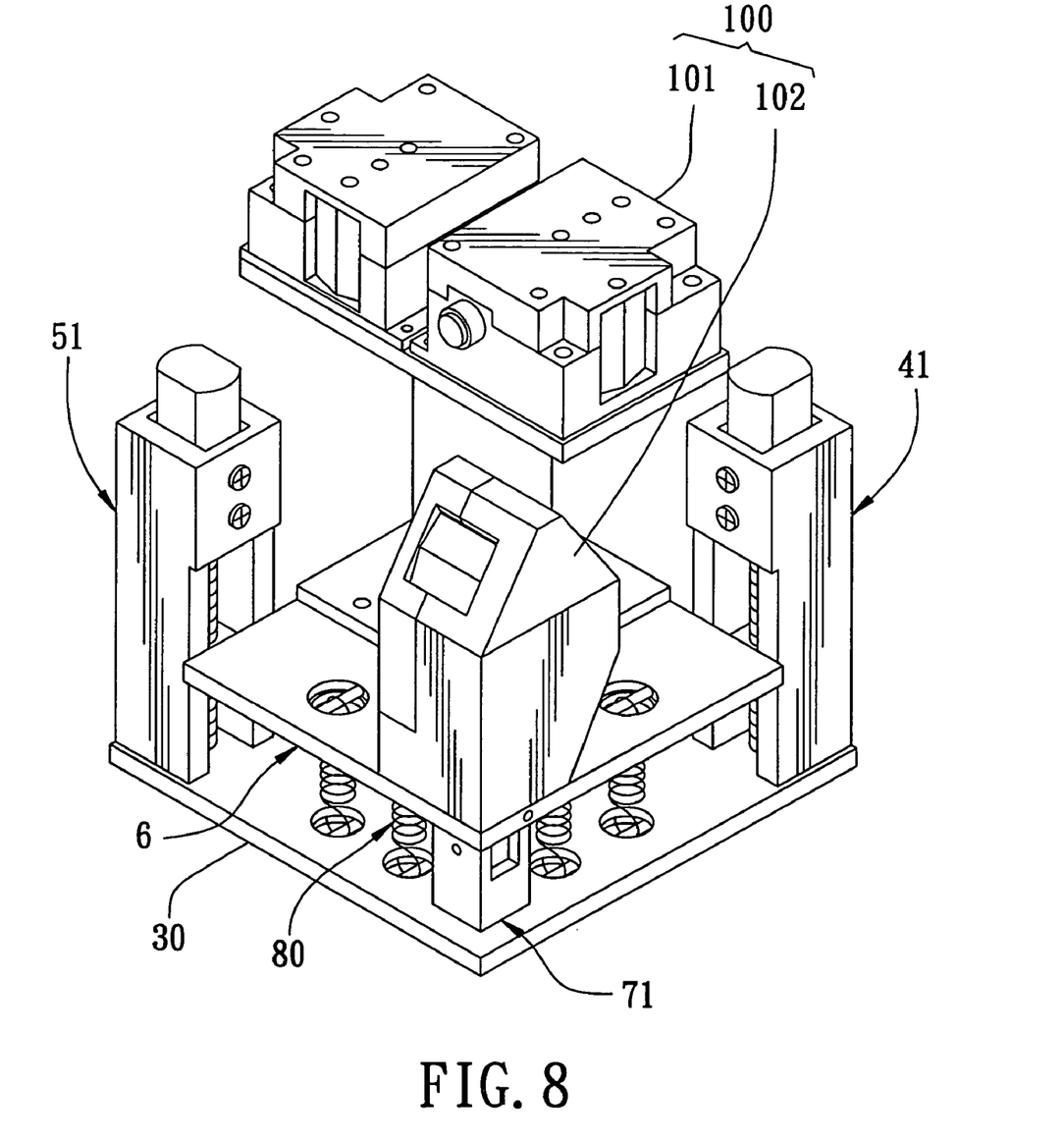
FIG. 8 is a perspective view to illustrate how a horizontal laser head and a vertical laser head are mounted on the carrier plate of the preferred embodiment of this invention.

By allowing the carrier plate 6 to be pivotable together with the pivot block 72 about the first pivot pin 73 relative to the pivot post 71 and the carrier plate 6 to be pivotable about the second pivot pin 74, the level of the object 100, which is mounted on the carrier plate 6, can be adjusted with relative ease, thereby eliminating the aforesaid drawback associated with the prior art.

With the invention thus explained, it is apparent that various modifications and variations can be made without departing from the spirit of the present invention.

We claim:

1. A level adjusting device for adjusting the level of an object mounted thereon, comprising:
    a base;
    spaced apart first and second posts mounted on and standing upright from said base;
    a first push lever mounted movably on said first post, extending in a first horizontal direction, and movable in a vertical direction that is perpendicular to said first horizontal direction;
    a second push lever mounted movably on said second post, extending in a second horizontal direction that is transverse to said first horizontal direction and that is perpendicular to said vertical direction, and movable in said vertical direction;
    a pivot post mounted on and standing upright from said base at a position that is vertically aligned with an intersection of said first and second horizontal directions;
    a first pivot pin extending in said first horizontal direction;
    a second pivot pin extending in said second horizontal direction;
    a pivot block pivoted to said pivot post through said first pivot pin so as to be pivotable about said first pivot pin;

a carrier plate connected to said first and second push levers so as to be moved upon movement of said first and second push levers, adapted to hold the object thereon, and pivoted to said pivot block through said second pivot pin so as to be pivotable about said second pivot pin upon movement of said first push lever in said vertical direction and so as to be pivotable together with said pivot block about said first pivot pin upon movement of said second push lever in said vertical direction, thereby permitting level adjustment of the object on said carrier plate; and a biasing unit disposed between and connected to said carrier plate and said base for urging said carrier plate against pushing action of said first push lever when said first push lever is moved in said vertical direction and pushing action of said second push lever when said second push lever is moved in said vertical direction.

2. The level adjusting device of claim 1, wherein said carrier plate has diagonally disposed first and second corners and a middle corner spaced apart from said first and second corners, said first and second corners being seated respectively on said first and second push levers, said middle corner being pivoted to said pivot block, said biasing unit including at least a first spring disposed between said first and middle corners, and at least a second spring disposed between said second and middle corners.

3. The level adjusting device of claim 2, further comprising a rigid first ball disposed between and in rolling contact with said first corner and said first push lever, and a rigid second ball disposed between and in rolling contact with said second corner and said second push lever.

4. The level adjusting device of claim 1, wherein each of said first and second posts is hollow, defines an inner space therein, and is formed with an elongated opening that extends in said vertical direction, that opens toward said pivot post, and that is in spatial communication with said inner space, each of said first and second posts having two opposite side walls that confine two opposite sides of said inner space, said level adjusting device further comprising first and second driving members that are mounted respectively on said first and second posts, and first and second screw rods that are disposed respectively in said inner spaces in said first and second posts, that extend in said vertical direction, and that are driven by said first and second driving members, each of said first and second push levers engaging threadedly a respective one of said first and second screw rods and being limited by said side walls of a respective one of said first and second posts so as to be limited from co-rotating with the respective one of said first and second screw rods upon actuation of the respective one of said first and second driving members and so as to move in said vertical direction upon rotation of the respective one of said first and second screw rods, said first and second push levers extending respectively from said first and second screw rods through said elongated openings in said first and second posts.

5. The level adjusting device of claim 1, wherein said carrier plate is formed with a through-hole that is vertically aligned with the intersection of said first and second horizontal directions, said pivot post being formed with a recess that is vertically aligned with and that opens toward said through-hole in said carrier plate, said pivot block having a lower portion that is received in said recess in said pivot post, and an upper portion that extends into said through-hole in said carrier plate, said first pivot pin extending through said pivot post and said lower portion of said pivot block, said second pivot pin extending through said upper portion of said pivot block and into said carrier plate.

\* \* \* \* \*